United States Patent
Mehaffey et al.

(10) Patent No.: US 9,561,944 B2
(45) Date of Patent: Feb. 7, 2017

(54) REVERSE DRIVE HANDLE FOR LIFT TRUCK

(71) Applicant: NACCO Materials Handling Group, Inc., Fairview, OR (US)

(72) Inventors: Doug Mehaffey, Portland, OR (US); John Timczyk, Camas, WA (US)

(73) Assignee: Hyster-Yale Group, Inc., Fairfield, OR (US)

( * ) Notice: Subject to any disclaimer, the term of this patent is extended or adjusted under 35 U.S.C. 154(b) by 0 days.

(21) Appl. No.: 14/547,056

(22) Filed: Nov. 18, 2014

(65) Prior Publication Data

US 2015/0142278 A1    May 21, 2015

Related U.S. Application Data

(60) Provisional application No. 61/906,250, filed on Nov. 19, 2013.

(51) Int. Cl.
    *B66F 9/075* (2006.01)
    *B66F 9/07* (2006.01)
    *B60K 26/02* (2006.01)

(52) U.S. Cl.
    CPC ........... *B66F 9/07572* (2013.01); *B60K 26/02* (2013.01); *B66F 9/07* (2013.01); *B60K 2026/029* (2013.01); *B60Y 2200/15* (2013.01); *B60Y 2200/62* (2013.01)

(58) Field of Classification Search
    CPC ........... E02F 9/2025; B60G 17/00; H02J 7/00; B60K 41/26; B62D 51/04; B60N 2/02; B66F 9/07572; B66F 9/07
    See application file for complete search history.

(56) References Cited

U.S. PATENT DOCUMENTS

| | | | |
|---|---|---|---|
| 1,672,212 A | | 6/1928 | Hale |
| 2,693,250 A | * | 11/1954 | Barrett .................. 187/222 |
| 3,039,638 A | * | 6/1962 | Shaffer ............. B66F 9/07559 414/635 |
| 3,195,913 A | | 7/1965 | Hallsworth |
| 3,465,841 A | | 9/1969 | Harshbarger et al. |
| 3,738,441 A | | 6/1973 | Kemner |
| 3,791,474 A | | 2/1974 | Stammen et al. |
| 3,827,747 A | * | 8/1974 | Cookes ................. B60N 2/062 248/371 |
| 3,937,294 A | | 2/1976 | Haddock |
| 4,273,224 A | * | 6/1981 | Brown et al. ................... 477/95 |

(Continued)

FOREIGN PATENT DOCUMENTS

| | | |
|---|---|---|
| DE | 10212623 | 10/2003 |
| DE | 10347925 | 5/2005 |

(Continued)

OTHER PUBLICATIONS

S01361156900 Manual Supplement; Model: H8.00-16.00XM-6; NAACO Materials Handling Group Pty Ltd; pp. 1-10; Jan. 2006.

(Continued)

*Primary Examiner* — Tuan C. To
(74) *Attorney, Agent, or Firm* — Schwabe Williamson & Wyatt

(57) ABSTRACT

A drive handle located behind an operator seat comprises a throttle used to drive a lift truck in reverse without requiring the operator's foot to actuate a floor-based throttle.

19 Claims, 5 Drawing Sheets

(56) References Cited

U.S. PATENT DOCUMENTS

| | | | |
|---|---|---|---|
| 4,372,341 A | 2/1983 | Crawley | |
| 4,702,520 A | 10/1987 | Whisler et al. | |
| 4,986,387 A * | 1/1991 | Thompson | B62D 7/142 |
| | | | 180/212 |
| 5,036,942 A | 8/1991 | Loewen | |
| 5,052,512 A | 10/1991 | Pakosh et al. | |
| 5,201,629 A * | 4/1993 | Simpson | B66F 9/07545 |
| | | | 180/306 |
| 5,265,021 A | 11/1993 | Avitan | |
| 5,887,669 A | 3/1999 | Ostler et al. | |
| 5,890,562 A * | 4/1999 | Bartels | B60N 2/4693 |
| | | | 180/321 |
| 5,918,703 A * | 7/1999 | Nordstrom | B62B 3/0612 |
| | | | 187/222 |
| 6,112,612 A * | 9/2000 | Seksaria | B66F 9/20 |
| | | | 180/333 |
| 6,182,778 B1 | 2/2001 | Henshaw et al. | |
| 6,390,764 B1 | 5/2002 | Merlo et al. | |
| 6,550,562 B2 | 4/2003 | Brandt et al. | |
| 6,564,906 B1 | 5/2003 | Haack et al. | |
| 6,679,349 B1 | 1/2004 | Polish, Jr. | |
| 6,694,240 B1 | 2/2004 | Swick et al. | |
| 6,776,249 B2 | 8/2004 | Fortin | |
| 6,793,247 B2 | 9/2004 | Swetish | |
| 6,871,721 B2 | 3/2005 | Smiley et al. | |
| 6,883,625 B2 | 4/2005 | Trego et al. | |
| 6,955,239 B2 | 10/2005 | Ueda et al. | |
| 6,962,231 B2 | 11/2005 | Carlsson et al. | |
| 6,971,194 B2 | 12/2005 | McClelland et al. | |
| 6,971,470 B2 | 12/2005 | McGoldrick | |
| 7,017,689 B2 | 3/2006 | Gilliland et al. | |
| 7,025,157 B2 | 4/2006 | Lindsay et al. | |
| 7,051,832 B2 | 5/2006 | Lewis et al. | |
| 7,121,608 B2 | 10/2006 | Billger et al. | |
| 7,142,963 B2 | 11/2006 | Borroni-Bird et al. | |
| 7,159,687 B2 | 1/2007 | Dunn et al. | |
| 7,353,099 B2 | 4/2008 | Lindsay et al. | |
| 7,374,004 B2 | 5/2008 | Kraimer et al. | |
| 7,428,943 B2 | 9/2008 | Smiley et al. | |
| 7,441,625 B2 | 10/2008 | Ackermann | |
| 7,484,587 B2 | 2/2009 | Portscheller et al. | |
| 7,496,441 B2 | 2/2009 | Brandt et al. | |
| 7,537,074 B2 | 5/2009 | Ishii et al. | |
| 7,726,745 B2 | 6/2010 | Bruns et al. | |
| 7,772,969 B2 | 8/2010 | Prohaska | |
| 7,775,317 B1 | 8/2010 | Goodwin et al. | |
| 7,784,581 B1 * | 8/2010 | Klas | B60N 2/4693 |
| | | | 180/329 |
| 7,849,951 B2 | 12/2010 | Borchers et al. | |
| 7,854,291 B2 | 12/2010 | Akahane et al. | |
| 7,870,919 B2 | 1/2011 | Waltz et al. | |
| 8,235,161 B2 | 8/2012 | Passeri et al. | |
| 8,356,688 B2 | 1/2013 | Passeri et al. | |
| 8,763,748 B2 * | 7/2014 | Tsuji | B60W 30/18181 |
| | | | 180/333 |
| 2003/0127272 A1 | 7/2003 | Baker et al. | |
| 2004/0099453 A1 * | 5/2004 | Guy | 180/65.1 |
| 2004/0100225 A1 * | 5/2004 | Neil et al. | 320/109 |
| 2004/0144590 A1 | 7/2004 | Fluent et al. | |
| 2005/0023069 A1 * | 2/2005 | Lewis | B66F 9/20 |
| | | | 180/321 |
| 2005/0023070 A1 * | 2/2005 | Smiley | B66F 9/20 |
| | | | 180/321 |
| 2005/0045409 A1 | 3/2005 | Fenelli et al. | |
| 2006/0137931 A1 | 6/2006 | Berg et al. | |
| 2006/0152052 A1 * | 7/2006 | Billger et al. | 297/285 |
| 2006/0205562 A1 * | 9/2006 | Howe | F16H 59/105 |
| | | | 477/96 |
| 2006/0207822 A1 | 9/2006 | Taylor | |
| 2007/0029741 A1 * | 2/2007 | Schroder | 280/6.159 |
| 2007/0074923 A1 | 4/2007 | Billger et al. | |
| 2007/0074924 A1 | 4/2007 | Schonauer et al. | |
| 2007/0119647 A1 | 5/2007 | Kusunoki | |
| 2007/0137904 A1 * | 6/2007 | Rose | B62B 3/0612 |
| | | | 180/19.1 |
| 2007/0295551 A1 * | 12/2007 | Proud | B60K 26/02 |
| | | | 180/333 |
| 2008/0011530 A1 * | 1/2008 | Oka | B60W 10/02 |
| | | | 180/306 |
| 2008/0047245 A1 | 2/2008 | MacGregor et al. | |
| 2008/0202858 A1 * | 8/2008 | Borchers | B60K 1/04 |
| | | | 187/233 |
| 2009/0012677 A1 * | 1/2009 | Passeri | B62B 5/06 |
| | | | 701/41 |
| 2009/0159358 A1 * | 6/2009 | Hosotani | B60W 10/06 |
| | | | 180/367 |
| 2009/0222167 A1 | 9/2009 | Goodwin et al. | |
| 2009/0223734 A1 | 9/2009 | Frett et al. | |
| 2011/0308889 A1 * | 12/2011 | Hall | B66F 9/125 |
| | | | 187/223 |
| 2012/0065847 A1 * | 3/2012 | Hobenshield | G05G 9/04785 |
| | | | 701/50 |
| 2014/0159881 A1 * | 6/2014 | Adami | B66F 17/003 |
| | | | 340/425.5 |
| 2014/0222300 A1 * | 8/2014 | Kakela | B60T 13/662 |
| | | | 701/50 |

FOREIGN PATENT DOCUMENTS

| | | |
|---|---|---|
| EP | 2573043 | 3/2013 |
| GB | 2008065 | 5/1979 |
| WO | 2006113510 | 10/2006 |
| WO | 2009009446 | 1/2009 |

OTHER PUBLICATIONS

European Patent Office; International Search Report and Written Opinion, mailed Oct. 16, 2008; PCT Application No. PCT/US08/069253, filed Jul. 3, 2008; 17 pages.

European Patent Office; International Preliminary Examination Report, issued Jan. 12, 2010; PCT Application No. PCT/US08/069253, filed Oct. 16, 2008; 10 pages.

European Patent Office; "Communication Pursuant to Article 94(3) EPC"; European Patent Application No. 08796101.7; dated Feb. 22, 2011; 4 pages.

Schwabe Williamson & Wyatt LLP, "Listing of Related Cases"; Apr. 28, 2016; 2 pages.

European Patent Office; "Extended European Search Report", mailed Feb. 27, 2013; EP Application No. 12196692.3, filed Jul. 3, 2008, 9 pages.

* cited by examiner

REVERSE DRIVE HANDLE FOR LIFT TRUCK

TECHNICAL FIELD

The present invention pertains to lift trucks, and in particular to a reverse drive handle for lift trucks.

SUMMARY

A drive handle located behind an operator seat comprises a throttle used to drive a lift truck in reverse without requiring the operator's foot to actuate a floor-based throttle.

DETAILED DESCRIPTION

The present inventors have recognized that operators of lift trucks equipped with a forward-facing seat, that is, a seat oriented such that a seated operator faces the forks, commonly drive such lift trucks in a reverse direction. For example, operators of such lift trucks commonly carry loads that impair forward vision, so such lift trucks may be operated largely in a reverse direction. The present inventors have also recognized that driving in reverse requires an operator to twist to look over a shoulder while contouring the body to maintain a foot on an accelerator pedal, and that such body position is uncomfortable, especially when held for prolonged or repeated periods.

Figure 1:
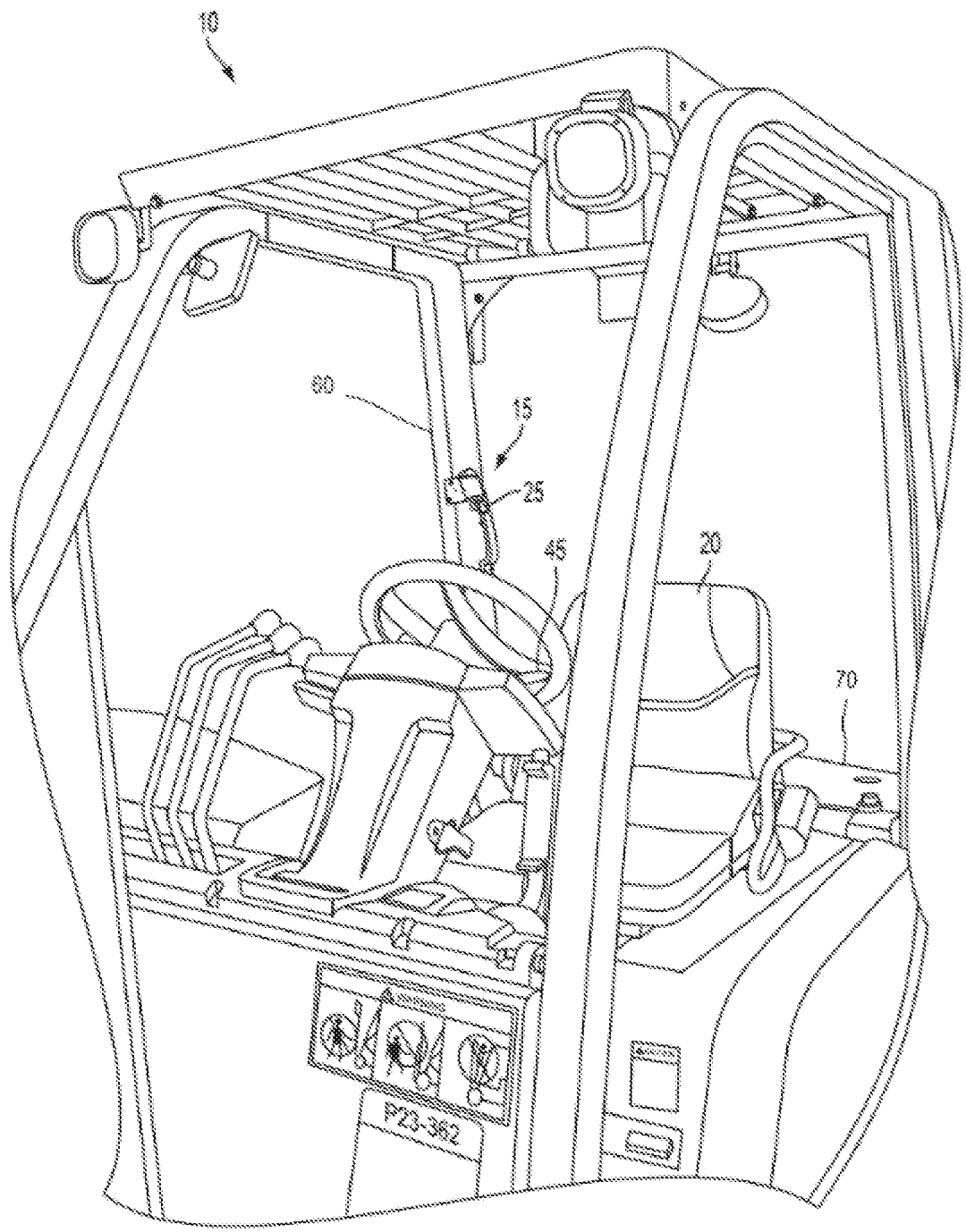
FIG. 1 illustrates a left front view of a lift truck with a reverse drive handle installed.
Figure 2:
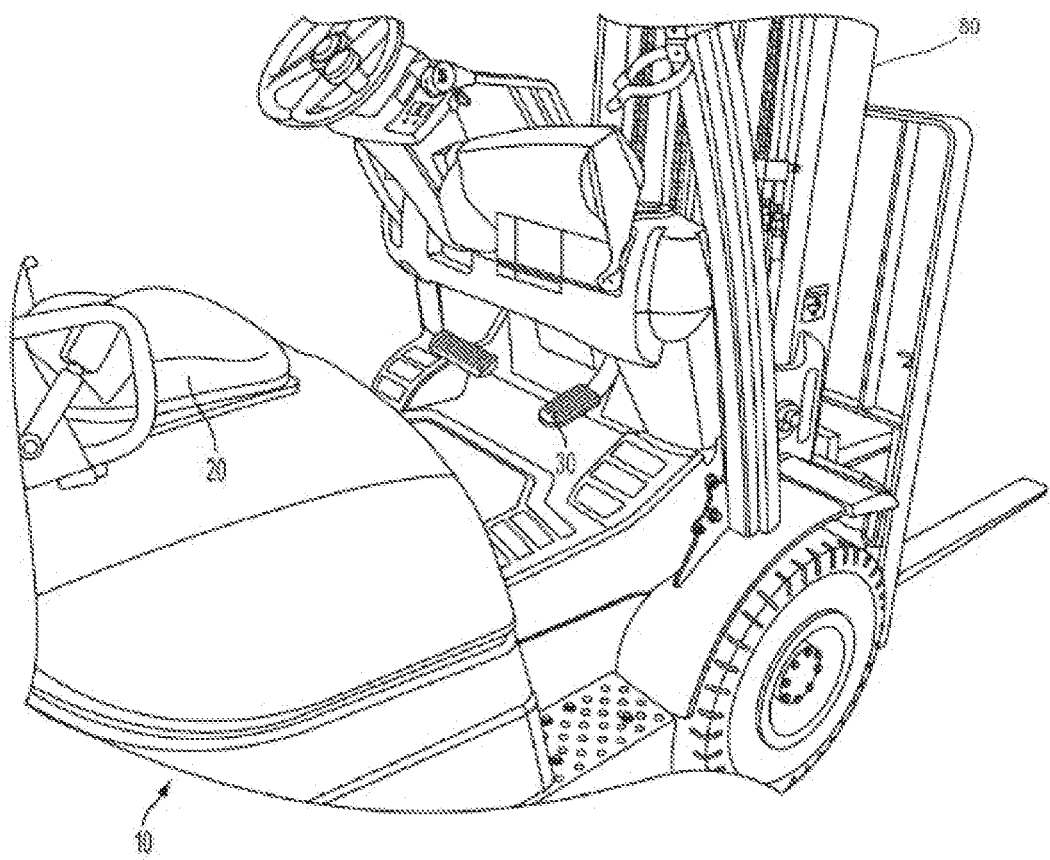
FIG. 2 illustrates a right side view of an operator area of the lift truck of FIG. 1.
Figure 3:
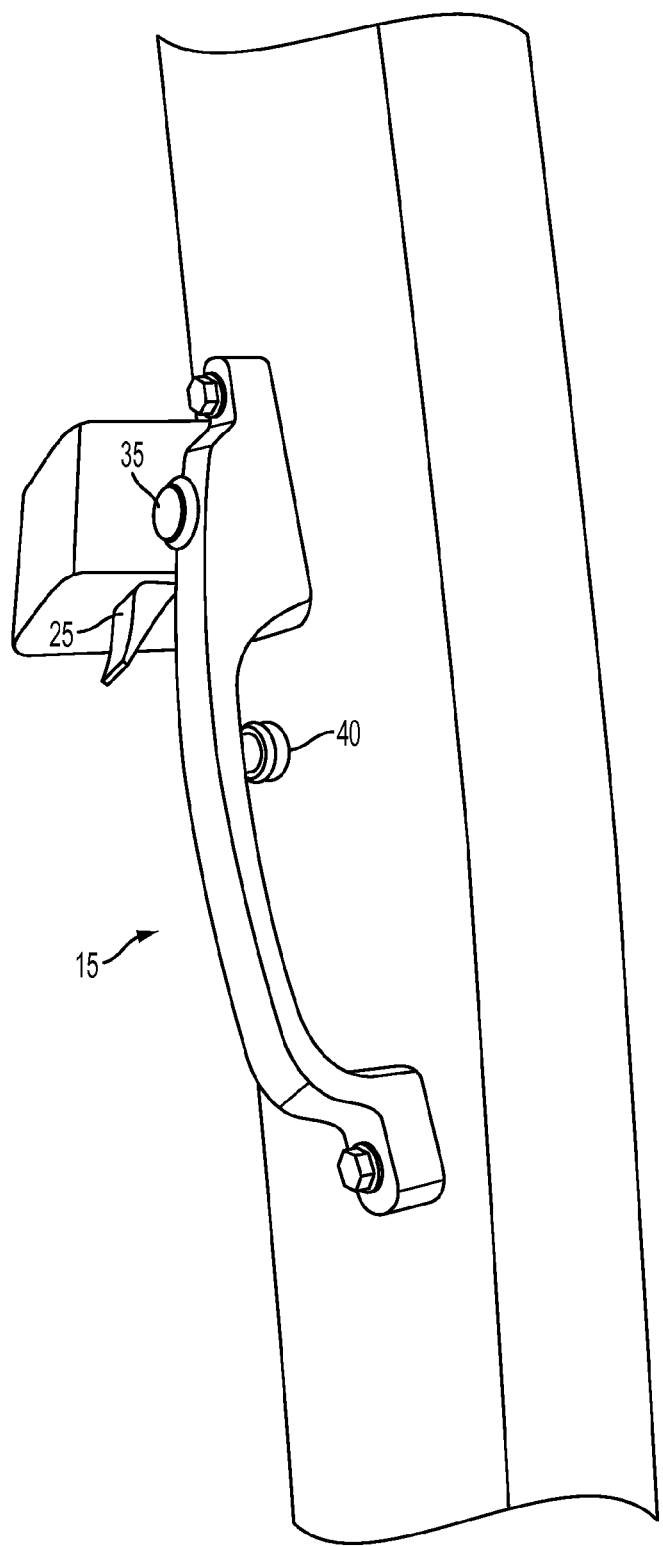
FIG. 3 illustrates a rear view of the reverse drive handle of FIG. 1.

As illustrated in FIGS. 1 and 2, the lift truck 10 includes an overhead guard 60, a counterweight 70 and a mast 80. The counterweight 70 is positioned opposite the mast 80 and behind the seat 20. As illustrated in FIGS. 1 and 3, a lift truck 10 is equipped with a reverse drive handle 15 to address the problems recognized by the present inventors. The reverse drive handle 15 is located at a position behind the seat 20 where it may be grasped by an operator to facilitate looking over the operator's shoulder. The reverse drive handle 15 comprises a throttle control 25 to facilitate ergonomic positioning of the operator's body by freeing the operator's right foot from the floor-based accelerator 30 (FIG. 2). By removing the requirement that the operator maintain the right foot on the accelerator 30, the throttle control 25 permits the operator to reposition the right foot, which provides a greater freedom to place the body in a comfortable position when driving the lift truck 10 in reverse when compared to typical lift trucks that require the right foot to operate a floor-based pedal throttle.

The illustrated reverse drive handle 15 includes an optional horn button 35 and an optional interlock switch 40. When provided, depression of the optional horn button 35 sounds the horn of the lift truck 10. When provided, an operator must engage the optional interlock switch 40 to activate the throttle control 25. Otherwise, activation of the throttle control 25 will not cause the lift truck 10 to move. When both a horn button 35 and an interlock switch 40 are provided, in one embodiment the interlock switch 40 does not need to be activated to enable the horn button 35 to sound the horn.

Figure 5:
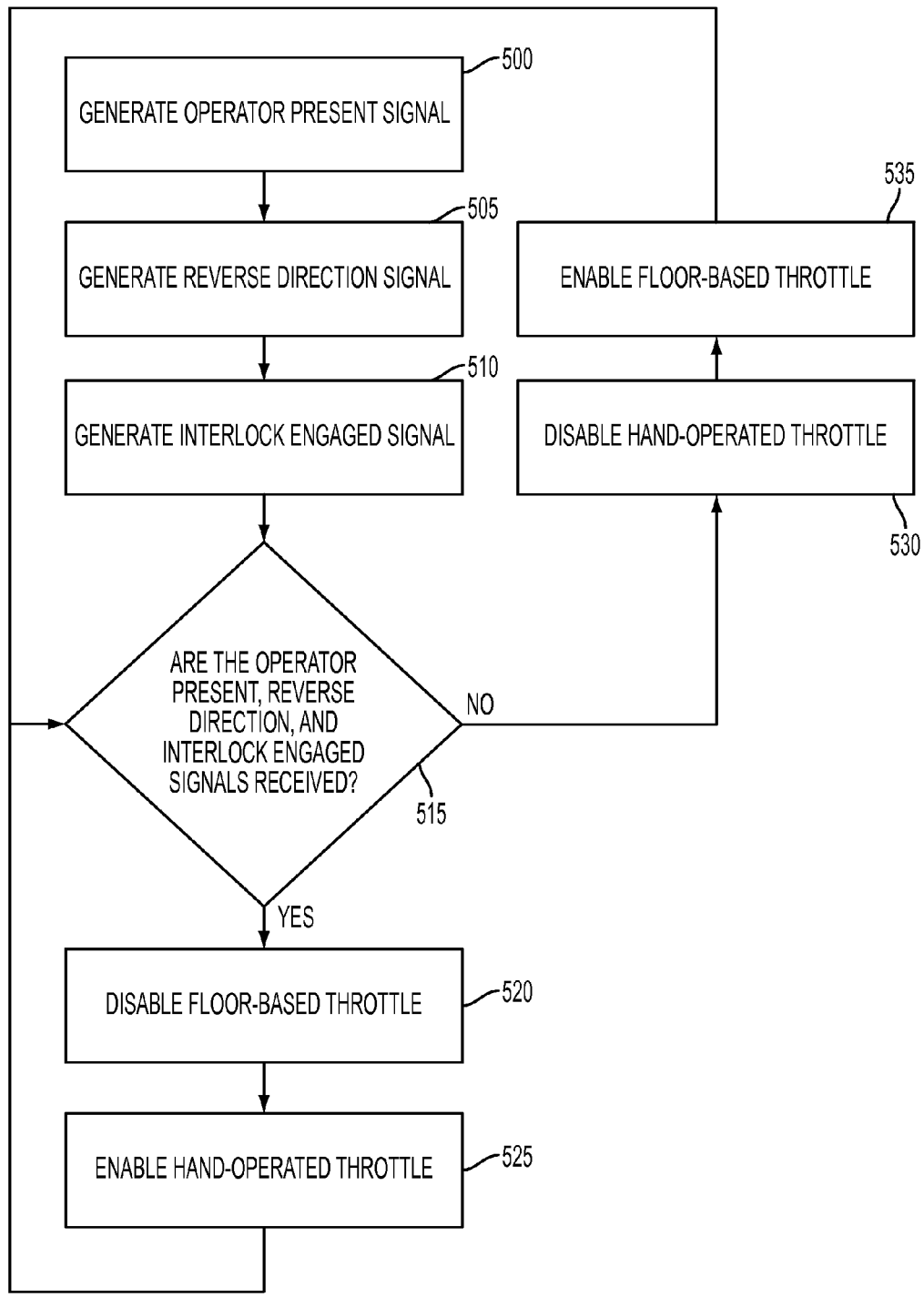
FIG. 5 illustrates a method of operating a lift truck equipped with a reverse drive handle.

A method of operating a lift truck 10 equipped with a drive handle 15 is illustrated in FIG. 5. At 500, an operator sits in seat 20 to activate an operator presence detector (not illustrated) which generates an operator present signal. At 505, the operator places the direction selector 45 into reverse, and a reverse direction signal is generated. At 510, the operator engages the interlock switch 40, and an interlock engaged signal is generated. The sequence in which the operator presence sensor is activated, the lift truck 10 is put into reverse, and the interlock switch 40 is engaged can be performed in any order.

At 515, a controller (not illustrated) determines whether the operator present, reverse direction, and interlock engaged signals are being received by the controller. If so, processing continues at 520 and 525. If not, processing continues at 530 and 535.

At 520, the controller disables the accelerator 30 in response to receiving the operator present signal, the reverse direction signal, and the interlock engaged signal. At 525, the controller enables the throttle control 25 in response to receiving the operator present signal, the reverse direction signal, and the interlock engaged signal. The accelerator 30 remains disabled and the throttle control 25 remains enabled as long as the controller receives the operator present signal, the reverse direction signal, and the interlock engaged signal.

At 530, the controller disables the throttle control 25 in response to not receiving one or more of the operator present signal, the reverse direction signal, and the interlock engaged signal. At 535, the controller enables the accelerator 30 in response to not receiving one or more of the operator present signal, the reverse direction signal, and the interlock engaged signal. The accelerator 30 remains enabled and the throttle control 25 remains disabled as long as the controller does not receive one or more of the operator present signal, the reverse direction signal, and the interlock engaged signal.

Preferably, operation of the throttle control 25, after it has been enabled by the controller, permits the lift tuck 10 to accelerate and move in a reverse direction, but not in a forward direction. Throttle control 25 preferably includes a graduated switch such that a small amount of movement of the throttle control 25 causes a small acceleration of the lift truck 10 and a larger amount of movement of the throttle control 25 causes a larger acceleration of the lift truck 10. When an operator holds the throttle control 25 at a relatively constant position, the lift truck 10 preferably moves at a relatively constant speed.

While the reverse drive handle 15 is illustrated to the right of the seat 20, a reverse drive handle 15 may be located to the left of the seat 20, or two reverse drive handles 15 may be provided, one to the right and one to the left of the seat 20. When two reverse drive handles 15 are provided, operation of the interlock switch 40 on one of the reverse drive handles 15 preferably causes the controller to deactivate (or keep inactive) the throttle switch 25 on the other reverse drive handle 15.

Receiving the operator present signal is optional as a condition for activating the throttle switch 25. In some embodiments, lack of an operator present signal received by the controller may be used to deactivate the lift truck 10's drive function altogether.

Deactivating the floor-based accelerator 30 in response to receiving the reverse direction signal, the interlock signal, and optionally, the operator present signal is optional. In some embodiments the floor-based accelerator 30 may be left in an active state to provide the operator a choice of using either, or both of, the throttle switch 25 and the accelerator 30 to move the lift truck 10 backwards.

While a push-button style interlock switch 40 is illustrated, any suitable sensor for detecting the presence of an operator's hand on the reverse drive handle 15 may be used. For example, an interlock switch may comprise a photosensitive element that provides a signal in response to a reduction in detected light, a pressure switch, or other suitable switch or detector. Likewise, a thumb activated all-terrain-vehicle-style throttle switch 25 is illustrated, but any suitable throttle may be used such as, but not limited to, a trigger throttle.

Figure 4:
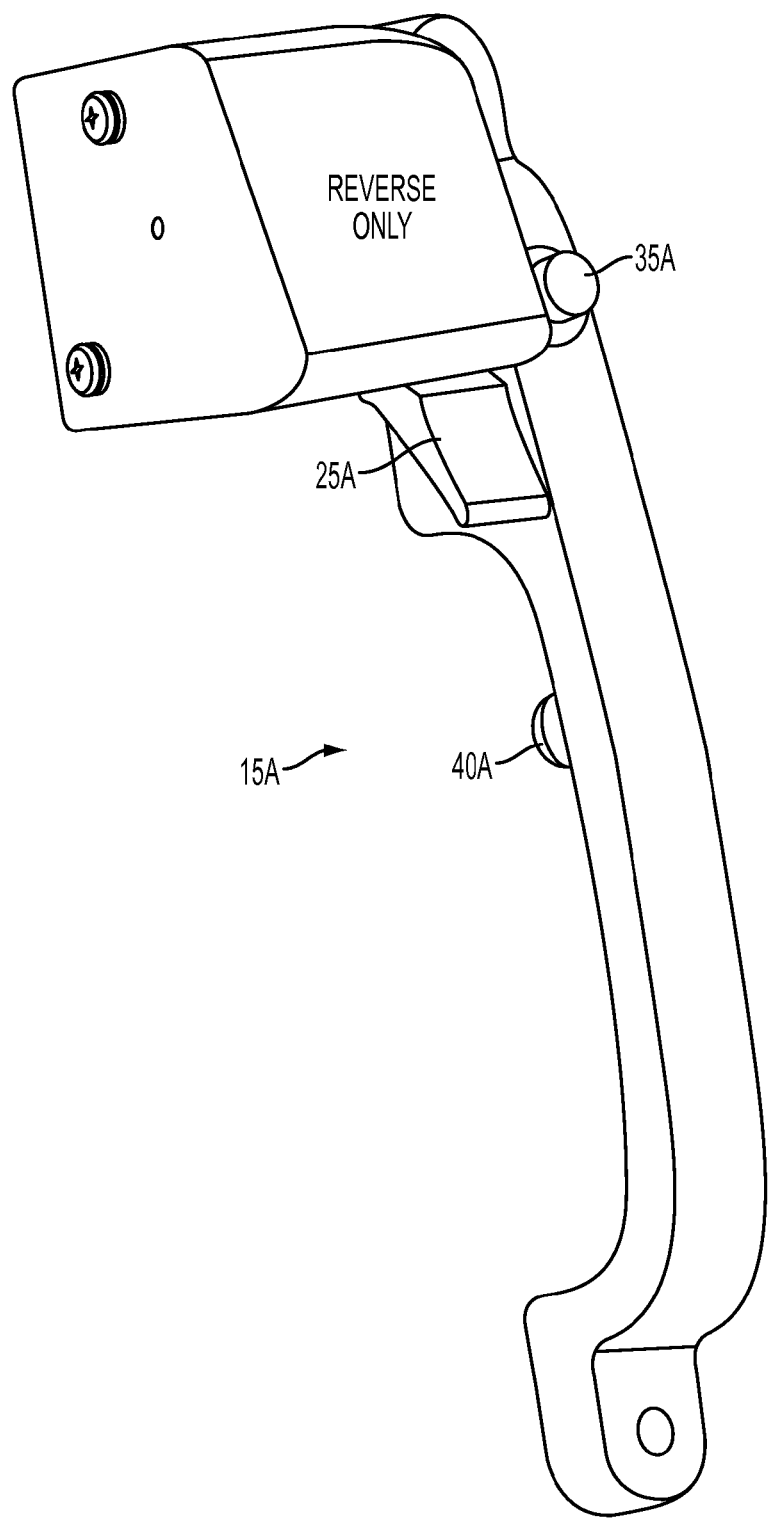
FIG. 4 illustrates an embodiment of a reverse drive handle.

FIG. 4 illustrates a reverse drive handle 15A including a horn button 35A, an interlock switch 40A and a throttle control 25A.

The foregoing is a detailed description of illustrative embodiments of the invention using specific terms and expressions. Various modifications and additions can be made without departing from the spirit and scope thereof. Therefore, the invention is not limited by the above terms and expressions, and the invention is not limited to the exact construction and operation shown and described. On the contrary, many variations and embodiments are possible and fall within the scope of the invention which is defined only by the claims that follow.

The invention claimed is:

1. A method of operating a lift truck comprising:
receiving a reverse direction signal at a controller;
receiving an interlock engaged signal at the controller;
via the controller, activating a hand operated throttle located behind a driver seat in response to receiving the reverse direction signal and the interlock engaged signal; and
via the controller, moving the lift truck in a reverse direction in response to receiving a throttle signal from the hand operated throttle located behind the driver seat.

2. A method according to claim 1, further comprising via the controller, deactivating a floor-based throttle in response to receiving the reverse direction signal and the interlock engaged signal at the controller.

3. A method according to claim 1, further comprising receiving an operator present signal at the controller;
wherein via the controller, activating a hand operated throttle located behind a driver seat is further in response to receiving the operator present signal.

4. A method according to claim 3, further comprising:
via the controller, deactivating a floor-based throttle in response to receiving the interlock engaged signal and the operator present signal.

5. A method according to claim 1, wherein the hand operated throttle is secured to an overhead guard of the lift truck.

6. A lift truck comprising:
a mast;
a seat oriented such that a seated operator faces the mast;
a counterweight positioned opposite the mast and behind the seat;
a floor-based accelerator;
an overhead guard; and
a handle secured to the overhead guard and located behind the seat, wherein the handle comprises a hand operated throttle configured to accelerate the lift truck in a direction opposite the mast.

7. A lift truck according to claim 6, further comprising:
an interlock switch positioned such that an operator's hand is on the handle to activate the interlock switch; and
a controller;
wherein the controller is programmed to activate the hand operated throttle if the controller receives a reverse direction signal and an interlock engaged signal.

8. A lift truck according to claim 7, wherein:
the controller is further programmed to activate the hand operated throttle if the controller receives an operator present signal, the reverse direction signal, and the interlock engaged signal.

9. A lift truck according to claim 8, wherein:
the controller is further programmed to deactivate the floor-based throttle in response to receiving the operator present signal, the reverse direction signal, and the interlock engaged signal.

10. A lift truck according to claim 6, wherein the hand operated throttle is prohibited from accelerating the lift truck in a direction of the mast.

11. A lift truck according to claim 6, wherein the hand operated throttle comprises a graduated switch, such that a small amount of movement of the hand operated throttle control causes a small acceleration of the lift truck, and a larger amount of movement of the hand operated throttle control causes a larger acceleration of the lift truck.

12. A lift truck according to claim 6, further comprising a second handle secured to the overhead guard and located behind the seat, wherein the second handle comprises a second hand operated throttle configured to accelerate the lift truck in the direction opposite the mast.

13. A lift truck according to claim 12, wherein the handle is located behind and to a right side of the seat and wherein the second handle is located behind and to a left side of the seat.

14. A lift truck according to claim 12, further comprising:
a first interlock switch associated with the handle which is configured to deactivate the second hand operated throttle; and
a second interlock switch associated with the second handle which is configured to deactivate the hand operated throttle.

15. A lift truck comprising:
a hand operated throttle located behind a driver seat;
means for generating an interlock engaged signal; and
a controller configured to:
activate the hand operated throttle in response to receiving the interlock engaged signal;
deactivate a floor-based throttle in response to receiving either the interlock engaged signal or an operator present signal; and
move the lift truck in a reverse direction in response to receiving a throttle signal from the hand operated throttle.

16. A lift truck according to claim 15, wherein the controller is configured to activate the hand operated throttle located behind the driver seat in response to receiving both an operator present signal and the interlock engaged signal.

17. A lift truck according to claim 15, wherein the hand operated throttle is secured to an overhead guard of the lift truck.

18. A lift truck comprising:
a hand operated throttle located behind a driver seat;

means for generating an interlock engaged signal including:
  first means for generating an interlock engaged signal associated with the hand operated throttle; and
  second means for generating an interlock engaged signal associated with a second hand operated throttle located behind the seat; and
a controller configured to:
  activate the hand operated throttle in response to receiving the interlock engaged signal from the first means for generating an interlock engaged signal; and
  move the lift truck in a reverse direction in response to receiving a throttle signal from the hand operated throttle.

19. A lift truck according to claim 18, wherein the hand operated throttle is secured to a right side of an overhead guard of the lift truck, and wherein the second hand operated throttle is secured to a left side of the overhead guard.

* * * * *